T. S. LEESE.
FLUID REGULATING VALVE.
APPLICATION FILED NOV. 21, 1918.

1,314,003.

Patented Aug. 26, 1919.

WITNESSES
J. Herbert Bradley.
Lois Wineman.

INVENTOR
Thaddeus S. Leese
by C. M. Clarke
his attorney

UNITED STATES PATENT OFFICE.

THADDEUS S. LEESE, OF AVALON, PENNSYLVANIA, ASSIGNOR OF ONE-HALF TO HARVEY L. HOLMES, OF GENEVA, NEW YORK.

FLUID-REGULATING VALVE.

1,314,003.  Specification of Letters Patent.  Patented Aug. 26, 1919.

Application filed November 21, 1918. Serial No. 263,498.

*To all whom it may concern:*

Be it known that I, THADDEUS S. LEESE, a citizen of the United States, residing at Avalon, in the county of Allegheny and State of Pennsylvania, have invented certain new and useful Improvements in Fluid-Regulating Valves, of which the following is a specification.

My invention consists of an improvement in fluid regulating valves and is particularly adapted to use as a gas burner valve for fuel gas. It has for its object to provide a gas burner valve having a proportioned supply of gas and air accurately adjusted and controlled whereby to furnish an increasing or decreasing amount of air with an increased or decreased supply of gas.

The device is also useful for other purposes where a regulated supply of fluid is desired, as in the case of water, and may be easily utilized as a spray jet for garden hose or the like.

The invention in the form illustrated comprises a mixer chamber having an air inlet opening and a gas supply valve with an air controlling sleeve connected with the valve, as hereinafter described, whereby to open and close the air inlet opening as the valve is adjusted to a varying gas supply.

One preferred form of the invention is illustrated in the accompanying drawings in which,—

Figure 1:
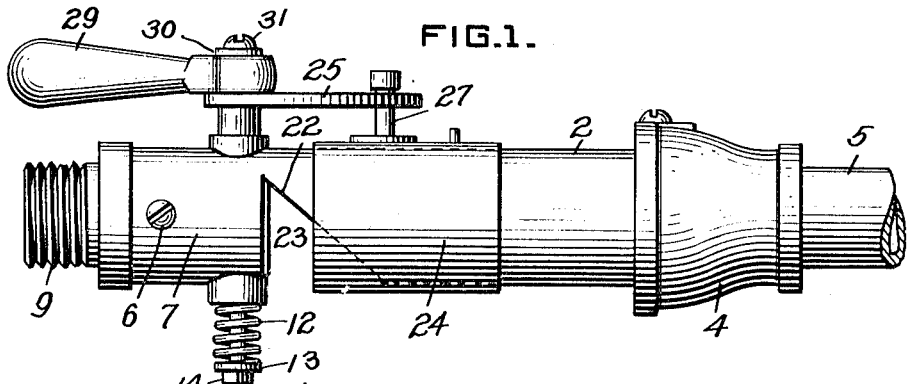
Figure 1 is a view of the device in side elevation.
Figure 2:
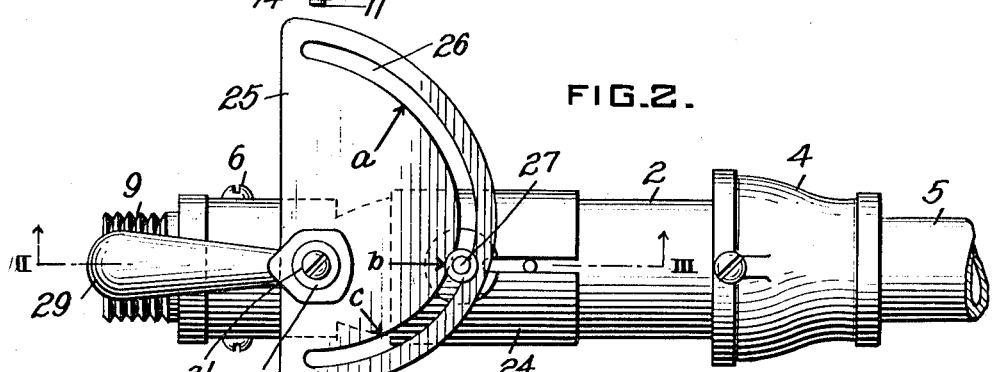
Fig. 2 is a plan view of Fig. 1.
Figure 3:
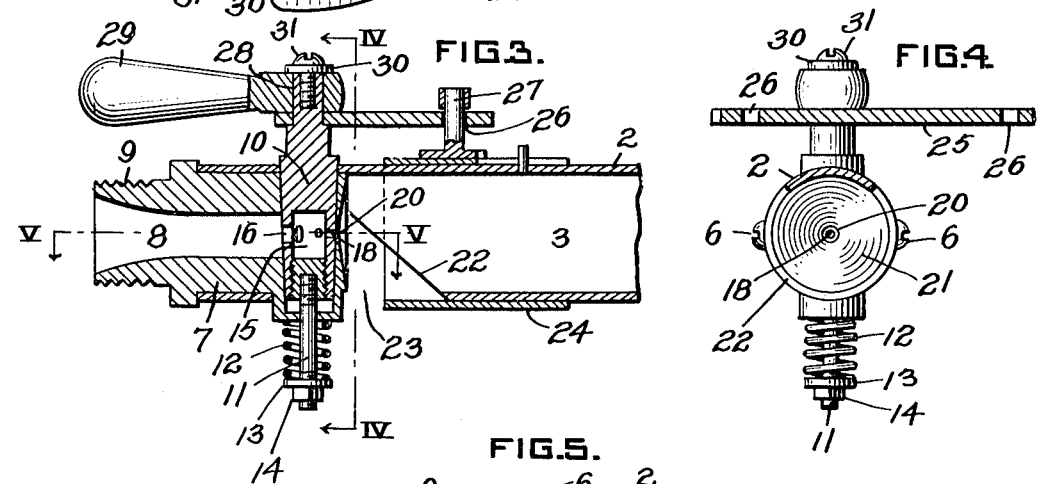
Fig. 3 is a partial longitudinal vertical section on line III—III of Fig. 2.
Figure 4:
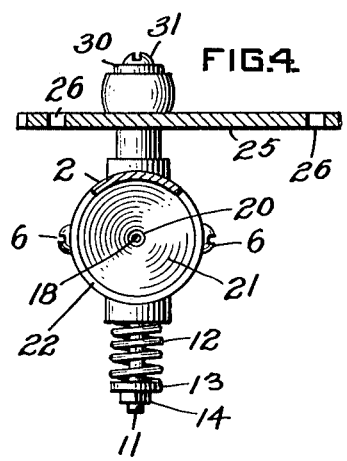
Fig. 4 is a cross section on the line IV—IV of Fig. 3.
Figure 5:
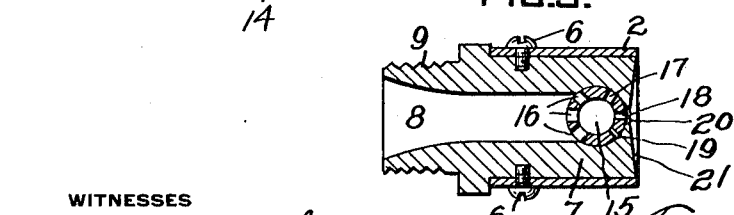
Fig. 5 is a horizontal section on the line V—V of Fig. 3.

In the drawings, 2 is a cylindrical or tubular barrel constituting the main frame member of the valve and providing at its forward end an interior mixing chamber 3 connected by coupling 4 with a mixture supply pipe 5 which may lead to a furnace, burner or any other combustion device. The rear end of the barrel 2 is connected by set screws 6 or other suitable means with a gas valve casing 7 having a central supply opening 8 and threaded as at 9 for connection with a gas supply pipe. At its forward end, casing 7 is provided with a rotatable, preferably tapered gas supply valve 10 mounted in a suitable receiving opening extending transversely of fitting 7 and maintained in substantially tight position by a retracing stem 11 and spring 12 bearing against terminal washer and nut 13, 14. By said means the tension of spring 12 may be adjusted.

Valve 10 is provided at its middle portion with a central gas chamber 15 into which by a series of ports 16 gas will pass from conduit 8 at whatever position the valve may assume. At its opposite side the wall of the valve chamber is provided with a series of gas exit ports 17, 18, 19, respectively, of gradually decreasing size, adapted to be brought into register with a central opening 20 formed in the inner end of fitting 7. Said opening is somewhat larger than the largest of the gas exit ports 17, 18, 19, and is arranged centrally of the inner end of the fitting 7, which inclines inwardly toward the opening 20 as indicated at 21, providing a smooth receding unobstructed wall.

Adjacent to this gas opening, the barrel 3 is cut away at an incline as indicated at 22, providing a flaring opening 23 for inflow of air from the exterior almost entirely around the gas supply port. For the purpose of controlling such air supply, I provide a sleeve 24 slidably mounted around barrel 3 adapted to be adjusted forwardly or backwardly to open or close opening 23, in proportion with the desired gas supply.

In order to effect such proportionate adjustment of sleeve 24, in connection with the adjustment of valve 10, I provide a cam plate 25 having a cam slot 26 engaging a stud or pin 27 secured to and extending upwardly from the top of sleeve 24. Cam plate 25 is secured upon a squared stud 28 of valve 10 by handle 29 and a washer 30, and screw 31, as will be readily understood. By this means, as valve 10 is adjusted to furnish a greater or less supply of gas through the particular port 17, 18 or 19, sleeve 24 will be actuated by cam slot 26 to correspondingly adjust the sleeve and regulate the air supply proportionately.

For the purpose of indicating to the operator the various positions corresponding to the registering positions of the gas supply ports, cam plate 25 may be provided with indicating pointers or arrows *a*, *b* and *c* corresponding to ports 17, 18 and 19 and to their supply positions, when a particular pointer is in register with the stud 27. By this means the valve can be accurately set to give any desired supply of mixture. The especial advantage of such positive locating of valve 10 is that each particular jet opening 17, 18, 19 is thereby adjusted to the exact center of opening 20, so that the flow of gas is central of barrel 3 and is unobstructed by any overlapping or partial opening of the gas exit port, as in the case of the usual valve or cock supply. The number of the gas exit ports may be varied whereby to amplify the range of gas quantity supplied by increasing the number of ports and controlled positions.

If it is desired to use the device as a water jet, the casing 3 and its adjustable shell 24 may be merely omitted in front of the face 21 of valve casing 7, in which case the valve is merely provided with the handle 29, and any suitable position indicating means, as will be obvious.

The construction and operation of the invention will be readily understood and appreciated from the foregoing description and in operation the device is capable of giving an accurately adjusted and controlled supply of combustible mixture at all times, resulting in great economy and effecting most perfect combustion of the gas and air because of such regulation.

What I claim is:

1. A fluid regulating valve consisting of a casing having a front inwardly sloping face terminating in a thin edge surrounding a central circular outlet opening and a rear supply opening and a valve therein having a plurality of ports each of smaller diameter than and adapted to be located in central registering position with the front outlet opening of the casing.

2. A fluid regulating valve consisting of a casing having a front inwardly sloping face terminating in a thin edge surrounding a central circular outlet opening and a rear supply opening and a valve therein having a plurality of ports of varying size but of smaller diameter than the outlet opening and adapted to be located individually in central registering position therewith.

3. A fluid regulating valve consisting of a tubular casing having a transverse valve seat and a front inwardly sloping face terminating in a thin edge surrounding a centrally located circular outlet opening, a rear connecting portion having a central supply opening; and a rotatable valve in the transverse valve seat provided with a series of ports each of small diameter and adapted to register centrally with the front outlet opening in the casing and in open communication with the rear central supply opening.

4. A fluid regulating valve consisting of a tubular casing having a transverse valve seat and a front centrally located circular opening, a rear connecting portion, and a central supply opening, a forward mixing chamber casing having an air opening, and a sliding sleeve thereon having a stud and a rotatable valve in the transverse valve seat provided with a middle cavity, a series of ports each adapted to register with the central opening in the casing, and one or more ports communicating with the supply opening, and an operating handle provided with a cam engaging the stud of the sliding sleeve.

5. In combination, a valve casing having at one end a supply chamber and at the other end an outlet opening and provided with an intervening valve seat, a valve in said seat having a plurality of ports each adapted to be located in central registering position with the outlet opening and in circulating communication with the supply chamber, a tubular barrel extending beyond the outlet end of the valve casing having a lateral air inlet opening, and an air-controlling sleeve slidably mounted thereon, and a slotted cam plate operatively connected with the valve and the sleeve whereby they are actuated together.

6. In combination, a valve casing having at one end a supply chamber and at the other end an outlet opening and provided with an intervening valve seat, a valve in said seat having a plurality of ports each adapted to be located in central registering position with the outlet opening and in circulating communication with the supply chamber, a tubular barrel extending beyond the outlet end of the valve casing having a lateral air inlet opening, an air-controlling sleeve slidably mounted thereon, and an actuating cam operatively connecting the sleeve with the valve whereby to move the same in conformity with the operation of the valve.

7. In combination, a valve casing having at one end a supply chamber and at the other end an outlet opening and provided with an intervening valve seat, a valve in said seat having a plurality of ports each adapted to be located in central registering position with the outlet opening and in circulating communication with the supply chamber, a tubular barrel extending beyond the outlet end of the valve casing having a lateral air inlet opening, an air controlling sleeve slidably mounted thereon, having a projecting stud, a slotted cam plate secured to the valve engaging said stud, and an operating handle for the valve.

8. In combination, a valve casing having at one end a supply chamber and at the other end an outlet opening and provided with an intervening valve seat, a valve in said seat having a plurality of ports each adapted to be located in central registering position with the outlet opening and in circulating communication with the supply chamber, a tubular barrel extending beyond the outlet end of the valve casing having a lateral air inlet opening, an air controlling sleeve slidably mounted thereon, having a projecting stud, a slotted cam plate secured to the valve engaging said stud and having a plurality of indicators thereon corresponding to the valve ports, and a handle for actuating the valve and cam plate together.

In testimony whereof I hereunto affix my signature.

THADDEUS S. LEESE.